United States Patent [19]

Horie et al.

[11] Patent Number: 5,245,491

[45] Date of Patent: Sep. 14, 1993

[54] MAGNETO-OPTICAL HEAD EMPLOYING OPTICAL FIBER CONNECTED STATIONARY AND MOVABLE PORTIONS

[75] Inventors: Makoto Horie; Hideyuki Takashima, both of Hitachi; Hirobumi Ouchi, Hino; Shigeru Nakamura, Tachikawa; Masahiro Ojima, Tokyo, all of Japan

[73] Assignees: Hitachi Cable Limited; Hitachi, Ltd., both of Tokyo, Japan

[21] Appl. No.: 531,989

[22] Filed: Jun. 1, 1990

[30] Foreign Application Priority Data

Jun. 2, 1989 [JP] Japan .................. 1-140836

[51] Int. Cl.$^5$ .................. G11B 5/127; G11B 11/00; G11B 7/12
[52] U.S. Cl. .................. 360/114; 369/13; 369/110
[58] Field of Search .................. 360/114, 59; 369/13, 369/110, 112, 114, 121

[56] References Cited

U.S. PATENT DOCUMENTS

| | | | |
|---|---|---|---|
| 4,558,440 | 12/1985 | Tomita | 360/114 |
| 4,771,415 | 9/1988 | Taki | 369/121 |
| 4,794,586 | 12/1988 | Korth | 369/215 |
| 4,803,579 | 2/1989 | Koyama | 360/114 |
| 4,931,634 | 6/1990 | Toyama | 360/114 |
| 4,935,911 | 6/1990 | Ohuchida et al. | 360/114 |
| 4,953,124 | 8/1990 | Koyama | 360/114 |
| 4,955,006 | 9/1990 | Fukushima et al. | 360/59 |
| 4,979,158 | 12/1990 | Yoda | 360/114 |
| 4,991,160 | 2/1991 | Premji | 360/114 |
| 5,004,326 | 4/1991 | Sasaki | 369/110 |
| 5,033,043 | 7/1991 | Hayakawa | 369/112 |
| 5,033,828 | 7/1991 | Haruta | 369/110 |
| 5,050,143 | 9/1991 | Bernstein | 360/114 |
| 5,070,494 | 12/1991 | Emoto et al. | 369/112 |
| 5,099,470 | 3/1992 | Matsubayashi | 360/114 |

Primary Examiner—Stuart S. Levy
Assistant Examiner—Jefferson Evans
Attorney, Agent, or Firm—Dykema Gossett

[57] ABSTRACT

An optical fiber type magneto-optical head is capable of realizing satisfactory reductions in size and weight of a movable portion of an optical head. An extinction-type form of the optical fiber type magneto-optical head comprises a first optical device for condensing a polarized light beam and leading the light beam into a polarization-maintaining optical fiber, a second optical device for focusing light emerging from the optical fiber into a beam spot on a magnetic recording medium, a detector for detecting via the optical fiber light reflected from the magnetic recording medium with a change in polarized state, and an azimuth rotator disposed between the second optical device and the optical fiber, wherein the azimuth rotator is designed so that the angle of optical rotation upon one pass therethrough is $$\theta k/2 \pm n\cdot 45°$$

where
$\theta k/2 \pm$: the Kerr rotation angle of a magnetic recording film of the recording medium,
$N = 0, 1, 2, \ldots$.

A differential-type form of the optical fiber type magneto-optical head comprises, instead of the above-mentioned azimuth rotator, an azimuth rotator so designed that the angle of optical rotation upon one pass therethrough is $$22.5° \pm 45°\cdot n \ (n=0, 1, 2, \ldots).$$

17 Claims, 7 Drawing Sheets

MAGNETO-OPTICAL HEAD EMPLOYING OPTICAL FIBER CONNECTED STATIONARY AND MOVABLE PORTIONS

BACKGROUND OF THE INVENTION

1. Technical Field

This invention relates to an optical head for optically reading information which is magnetically recorded on a medium, and more particularly to an optical head using a polarization-maintaining optical fiber in an optical system.

2. Background Art

As an information medium of the type mentioned above, there is known a magneto-optic disk capable of recording, reproduction and erasure of information. Reproduction of magneto-optical signals is carried out by detection of the "Kerr effect", that is, the phenomenon observed at the time of reflection of a linearly polarized light by a magnetic recording film in which the light is reflected with a rotation of the plane of polarization of the light according to the direction of magnetization of the recording film at the point of reflection. There are two types of detection system for the Kerr effect: extinction type <1>, and differential type <2>.

The extinction type <1> of detection system will be explained referring to FIG. 9 of the accompanying drawings.

Laser light from a laser light source (not shown) is linearly polarized by a polarizer 1. The linearly polarized light is projected onto a magnetic recording film 2b provided on the back side of a substrate 2a of a magneto-optic disk 2 by coating. The light thus projected on the magnetic recording film 2b is reflected with rotation of the plane of polarization according to the direction of perpendicular magnetization of the recording film, by the Kerr effect. Where the principal direction of the polarizer 3 is set so that an extinction condition is obtained when the recorded information is "0", as shown in FIG. 10, the reflected light is transmitted through an analyzer 3 when the recorded information is "1". It is thus possible to read the magneto-optically recorded information through conversion of the information into electric signals by a detector 4 The intensity, Isig, of the light transmitted through the analyzer 3 when the recorded information is "1" is $$Isig \; K \cdot Io \; \sin\theta^2 \; (2\cdot\theta k) \qquad (1)$$

where
- Io: intensity of linearly polarized incident light,
- $\theta k$: Kerr rotation angle,
- K: proportionality factor determined by reflectance of recording film.

The representation in FIG. 10 is not based on the intensity of light but rather is based on the amplitude of light.

Now the differentiatype <2> of detection system will be explained below, with reference to FIG. 11.

Laser light from a laser light source (not shown) is linearly polarized by a polarizer 1, and the linearly polarized light is reflected by a magnetic recording film 2b provided on the back side of a substrate 2a of a magneto-optic disk 2 by coating. Where the principal direction of a polarization beam splitter (PBS) 5 is inclined by 45°, as shown in FIG. 12, the light component Is projected on axis S (s-polarized light component) is incident on a detector 4, while the light component Ip projected on axis P (p-polarized light component) is incident on a detector 4b. The intensities of the polarized light components Ip and Is, for a signal "1", are $$Ip \; Io \; K/2(1+\sin 2\theta k) \qquad (2)$$

$$Is \; Io \; K/2(1-\sin 2\theta k) \qquad (3).$$

The optical signals are received by the detectors 4a and 4b for photoelectric conversion to obtain electric signals, which are inputted to a differential amplifier 6 to pick up a difference signal. The quantity of the thus obtained signal, as estimated in the same manner as in the extinction type <1> above, is $$\begin{aligned} Isig &= Ip - Is \\ &= Io \, K \sin(2\theta k). \end{aligned} \qquad (4)$$

The magneto-optical recording films used at present have a Kerr rotation angle $\theta k$ in the range of $\theta k \leq 1°$. Therefore, the extinction type <1> of detection system finds only limited use, because of the very small signal quantity [$\infty \sin^2 (2\theta k)$]. On the other hand, the differential type <2> of detection system provides a greater signal quantity [$\infty \sin (2\theta k)$] and, therefore, enables signal detection with good S/N. Accordingly, the detection of magneto-optical signals is generally performed by the differential type <2> of detection system.

The construction of a magneto-optical head in general use at present will now be explained referring to FIG. 13. This is an example of the differentiatype <2> of detection system.

Light emerging from a semiconductor laser 11 is converted by a collimating lens 12 into parallel rays of light, which are subjected to linear polarization by a polarizing prism 13. The parallel rays of linearly polarized light are focused by a focusing lens 14 into a minute spot on a magnetic recording film 2b of a magneto-optic disk 2. The reflected light from the magnetic recording film 2b is branched by the polarizing prism 13 into two portions. The plane of polarization of one of the two branched portions of reflected light is rotated by 45° by a halfwave plate 16, resulting in an azimuth shift of 45° between a polarization beam splitter 17 and the polarizing prism 13. The p-polarized and s-polarized light components, which are respectively transmitted through and reflected by the beam splitter 17, are received respectively by detectors 18a and 18b, and subjected to photoelectric conversion. Electric signals output from the detectors 18a and 18b are input to a differential amplifier 19 to obtain a difference signal, whereby it is possible to detect the Kerr rotation angle $\theta k$ of the recording film and, hence, to reproduce the recorded information.

In order to shorten the period of time required for reproduction of desired information, i.e. the so-called access time, in a magneto-optic disk device and to achieve reductions in the size and power consumption of the device, it is essentially required to reduce the weight of an optical head itself.

In the integral-type construction as shown in FIG. 13, however, there are limits to the reductions in size and weight and it is impossible to realize adaptation to increasing operating speeds of the device.

In view of this, a separate-type head has been put to practical use, in which, as shown in FIG. 14, the head is separated into a stationary portion 20 and a movable portion 30, with a focusing lens 14 as a separate unit, and light is transferred between the portions 20 and 30 by spatial propagation.

Where the light is thus transferred by spatial propagation, however, a beam of light in a forward path and a corresponding beam of light in a backward path might discord from each other because of errors in positioning the rails for the movable portion (pitching, yawing and rolling). Thus, there would arise the problems as follows:

(i) aberration is generated in the focused beam, making it impossible to focus a light beam into a minute spot and, therefore, to perform high-density recording;

(ii) deviations are generated in auto-focusing control or tracking control, necessitating correction means for such control;

and so on.

In view of the above problems, several proposals have been made concerning systems in which a stationary portion and a movable portion of an optical head are connected by optical fiber. However, none of the systems according to these proposals are satisfactory for practical use.

SUMMARY OF THE INVENTION

It is an object of this invention to provide an optical fiber type magneto-optical head which permits satisfactory reductions in the size and weight of a movable portion of the optical head.

Of the optical fiber type magneto-optical head according to this invention, an extinction-type form comprises first optical means for condensing a polarized light beam and leading the light beam into a polarization-maintaining optical fiber, second optical means for focusing light emerging from the optical fiber into a beam spot on a magnetic recording medium, a detector for detecting through the optical fiber light reflected back from the magnetic recording medium with a change in polarized state, and an azimuth rotator disposed between the second optical means and the optical fiber, wherein the azimuth rotator is designed so that the angle of optical rotation upon one pass therethrough is $$\theta k/2 \pm n\cdot 45°$$

where $\theta k/2$: the Kerr rotation angle of a magnetic recording film of the recording medium, $n = 0, 1, 2, \ldots$.

A differential-type form of the optical fiber type magneto-optical head according to this invention comprises, instead of the above-mentioned azimuth rotator, an azimuth rotator so designed that the angle of optical rotation upon one pass therethrough is $$22.5° \pm 45°\cdot n \quad (n=0, 1, 2, \ldots).$$

The polarized light, for instance, linearly polarized light emerges from the polarization-maintaining optical fiber while maintaining the plane of polarization thereof, is then transmitted through the azimuth rotator with the result of a $\theta A/2°$ rotation of the plane of polarization, and is projected onto the magnetic recording film. The light thus projected is reflected from the magnetic recording film with a $\pm \theta k$ rotation of the plane of polarization, according to the magnetization direction of the magnetic recording film. The reflected light is again transmitted through the azimuth rotator, by which the plane of polarization is rotated further by $\theta A/2°$, before the light is detected by the detector via the polarization-maintaining optical fiber.

In the case of the extinction-type form, the azimuth rotator is designed so that the angle of optical rotation upon one pass therethrough, $\theta A/2°$, is $$\theta A/2 = \theta k/2 \pm n\cdot 45° \quad (n=0, 1, 2, \ldots)$$

and, therefore, the plane of polarization of the light beam is rotated in the forward path and backward path by a total of $\theta A + \theta k$. That is to say, where the information recorded in the magnetic recording film is "0" (the Kerr rotation angle is $-\theta k$), the plane of polarization of the light beam is rotated twice, i.e., once in the forward path and once in the backward path, to be coincident with' the principal direction, resulting in extinction of the light with a Kerr rotation angle of $-\theta k$. Where the recorded information is "1" (the Kerr rotation angle is $+\theta k$), the plane of polarization of the resultant light beam discord with the principal direction, so that the light beam is detected by the detector.

In the case of the differential-type form, the azimuth rotator is designed so that the angle of optical rotation upon one pass therethrough, $\theta A/2°$, is $$\theta A/2 = 22.5° \pm n\cdot 45° \quad (n=0, 1, 2, \ldots)$$

and, therefore, the plane of polarization of the light beam is rotated in the forward path and backward path by a total of $45° \pm n\cdot 90°$ ($n=0, 1, 2, \ldots$). Thus, the light with a Kerr rotation angle of $-\theta k$ and the light with a Kerr rotation angle of $+\theta k$, corresponding respectively to the recorded information of "0" and "1", are detected by the detector.

In the cases of both the extinction-type form and the differential-type form, it is possible to connect the stationary portion and the movable portion of the optical head to each other by one polarization-maintaining optical fiber, thereby reducing the weight of the movable portion of the head and shortening the access time. Consequently, it is possible to provide an optical head remarkably enhanced in operating speed and remarkably reduced in size. Because the forward path and backward path of the light beam coincide with each other, in addition, there is no possibility of generation of aberration in the focused beam, generation of deviations in auto-focusing control or tracking control, or the like.

BRIEF DESCRIPTION OF THE DRAWINGS

FIGS. 1 to 8 illustrate embodiments of an optical fiber type magneto-optical head according to this invention, in which:

FIG. 1 is a view showing one embodiment of the extinction-type form of the head;

FIG. 2 is a diagram showing the azimuths of an analyzer and a polarizer for realizing the extinction-type form;

FIG. 3 is a view showing one embodiment of the differential-type form of the head;

FIG. 4 is a diagram showing the principal directions of an analyzer and a polarizer for realizing the differential-type form;

FIGS. 5 and 6 are views each showing one embodiment of this invention, in which the invention is applied to a stack-type disk device;

FIG. 7 is a view showing another embodiment of the extinction-type form;

FIG. 8 is a view showing another embodiment of the differential-type form;

DESCRIPTION OF THE PREFERRED EMBODIMENTS

Figure 1:
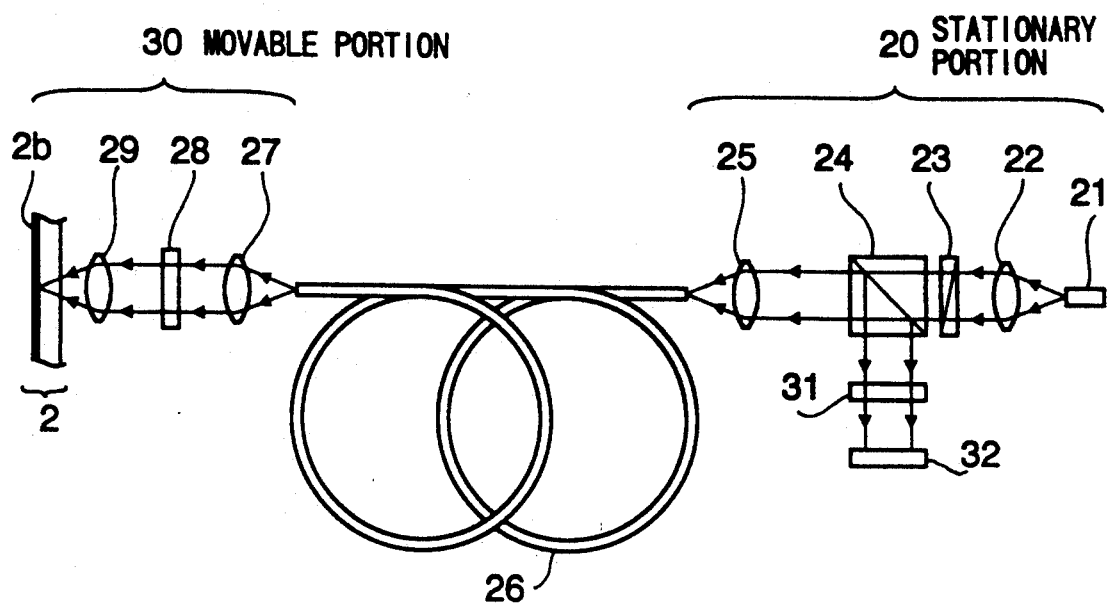
Figure 2:
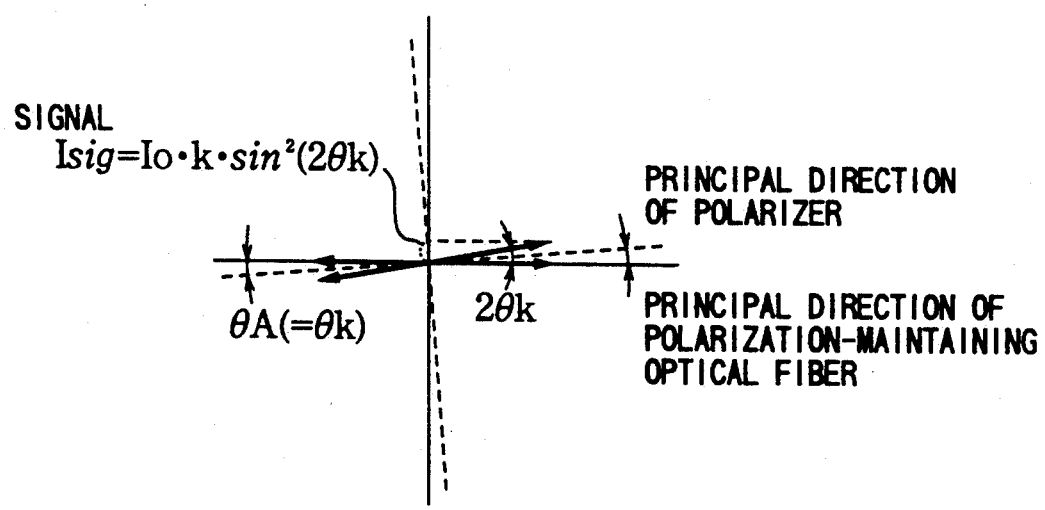

This invention will now be explained below, referring to some preferred embodiments thereof shown in the drawings.

FIG. 1 illustrates an extinction-type form of a magneto-optical head of this invention, in which a stationary portion °of the head is shown on the right side, and a movable portion 30 on the left side.

The stationary portion °comprises a semiconductor laser 21, a collimating lens 22, a polarizer 23 and a condensing lens 25 in that order, and further comprises a beam splitter 24 disposed between the polarizer 23 and the condensing lens 25, and an analyzer 31 and a detector 32 both disposed in the path of reflected light from the beam splitter 24. The movable portion 30 comprises a collimating lens 27 and a focusing lens 29, with an azimuth rotator 28 therebetween which comprises a Faraday element comprising an optically active substance.

Optical systems in the stationary portion 20 and the movable portion 30 are connected to each other by a polarization-maintaining optical fiber 26. The condensing lens 25 in the stationary portion °is for condensing a light beam and directing the light beam into the optical fiber 26, whereas the collimating lens 27 in the movable portion 30 is for converting a light beam emerging from the optical fiber 26 back into a beam of parallel rays.

The principal direction of the polarization maintaining optical fiber 26 coincides with the principal direction of the polarizer 3. If the principal directions discord from each other, a phase difference is generated in the optical fiber 26 to render the emerging light an elliptically polarized light, leading to deterioration of extinction ratio of the head optical system. That is, the S/N of signals would be too low to achieve practical signal detection, unless the principal direction of the optical fiber 26 coincides with the principal direction of the polarizer 3.

The operation of the optical systems will now be explained, following an optical path.

Light emitted from the semiconductor laser 21 is converted into a beam of parallel rays by the collimating lens 22. The beam of parallel rays is converted by the polarizer 23 into linearly polarized light, which is transmitted through the beam splitter 24, and is condensed by the condensing lens 25 onto one end of the polarization-maintaining optical fiber 26. Here, the azimuth of the linearly polarized light coincides with the azimuth of the optical fiber 26. Therefore, no phase difference is generated in the optical fiber 26, and the linearly polarized light is transmitted while maintaining the plane of polarization thereof, without being changed into an elliptically polarized light.

The linearly polarized light propagated through the polarization-maintaining optical fiber 26 and emerging from the other end of the optical fiber is then converted by the collimating lens 27 back into a beam of parallel rays, which is transmitted through the azimuth rotator 28, when the plane of polarization of the beam is rotated by $\theta A/2°$, i—e., the angle of optical rotation upon one pass through the azimuth rotator 28. The light beam is further focused by the focusing lens 29 into a beam spot, which is projected onto a magnetic recording film 2b of a magneto-optic disk 2.

The beam spot thus projected is reflected by the magnetic recording film 2b, when the plane of polarization is rotated by a Kerr rotation angle of $\pm\theta k$ (the minus sign is for a signal "0", and the plus sign for a signal "1") according to the magnetization direction of the recording film 2b. The reflected light from the magnetic recording film 2b is converted by the focusing lens 29 back into a beam of parallel rays. The beam of parallel rays is transmitted again through the azimuth rotator 28, when the plane of polarization is rotated further by $\theta A/2°$, and the beam is transmitted through the collimating lens 27, to be incident on the other end of the optical fiber 26. Thus, during the forward and backward transmission through the azimuth rotator 28, the plane of polarization of the light beam is rotated by $\theta A/2°$ in the forward path and by $\theta A/2°$ in the backward path, that is, by $\theta A°$ in total.

Consequently, the reflected light from the magnetic recording film 2b has a plane of polarization at an angle of $\theta A \pm \theta k$ to the principal direction of the polarization-maintaining optical fiber 26. The optical fiber 26 has characteristics for maintaining the intensities of light components projected on the principal axes, namely, the p-polarized component and the s-polarized component of the polarized light at the time of incidence.

When the angle of optical rotation upon one pass through the azimuth rotator, $\theta A/2°$, is $$\theta A/2 = \theta k/2 + n\cdot 45° (n=0, 1, 2, \ldots),$$

an extinction condition is obtained for a recording signal "0", so that an extinction-type optical system is obtained, which enables reproduction of information. That is to say, the forward and backward passage through the azimuth rotator 28 gives a rotation of $$\theta A = \theta k \pm n\cdot 90° (n=0, 1, 2, \ldots)$$

so that, when the recording signal in the magnetic recording film 2b is "0" (Kerr rotation angle is $\theta k$), the plane of polarization of the reflected light coincides with the principal direction of the polarization-maintaining optical fiber 26 and, hence, with the principal direction of the analyzer 31, resulting in that a signal light Isig with a Kerr rotation angle of θk is extinguished. Incidently, "n" as expressed in the above equations is intended to represent any number of desired rotations, i.e. 0, 1, 2, ... etc.

When the recording signal is "1" (Kerr rotation angle is +θk), on the other hand, the plane of polarization of the reflected light does not coincide with the principal direction of the analyzer 31. Therefore, the polarized light emerging from the polarization-maintaining optical fiber 26, converted back into a beam of parallel rays by the condensing lens 25 and reflected by the beam splitter 24 is transmitted through the analyzer 31, to be detected by the detector 32.

Though a prism capable of reflecting and transmitting the p-polarized light and s-polarized light in equal quantities ($R_S = R_P$) is used as the beam splitter 24 in the embodiment shown in FIG. 1, a polarization beam splitter ($T_S \leq 1$, $R_P \leq 1$) may also be used, in which case it is possible to omit the polarizer 23 and the analyzer 31.

Figure 3:
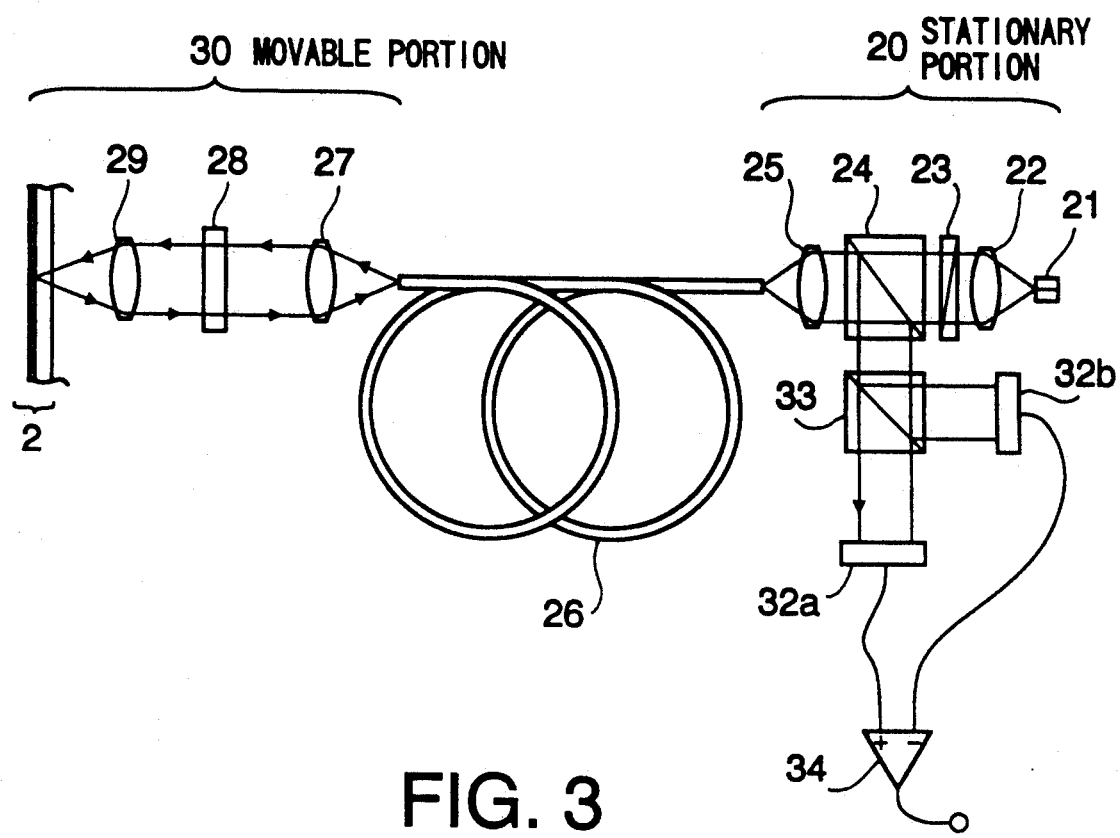
Figure 4:
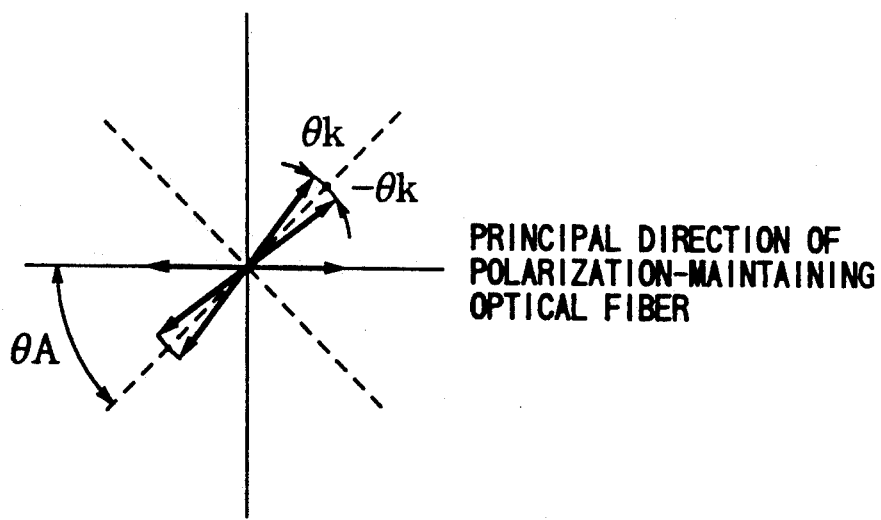

FIG. 3 illustrates one embodiment of the differential-type form of the magneto-optical head, which differs from FIG. 1 in the construction of the stationary portion and in the setting of the angle of optical rotation θA/2° upon one pass through the azimuth rotator 28.

In FIG. 3, a polarization beam splitter 33 is disposed, in place of the analyzer 31, in the optical path of the reflected light from a beam splitter 24. A detector 32a is disposed in the optical path of the light transmitted through the polarization beam splitter 33, and a detector 32b is disposed in the optical path of the light reflected from the polarization beam splitter 33. Outputs from the detectors 32a and 32b are input to a differential amplifier 34.

An azimuth rotator 28 disposed between a collimating lens 27 and a focusing lens 29 in a movable portion 30 is so designed that the angle of optical rotation upon one pass therethrough, θA/2°, is $$\theta A/2 = \pm 22.5° \cdot n \cdot 45° (n=0, 1, 2, \ldots).$$

Therefore, the plane of polarization of a light beam transmitted through the azimuth rotator 28 is rotated in the forward path and backward path by a total of $45° \pm n \cdot 90° (n=0, 1, 2, \ldots)$, and a polarized light with a Kerr rotation angle of $-\theta k$ or $+\theta k$ according to a recording signal "0" or "1" is incident on a polarization-maintaining optical fiber 26, to be propagated through the optical fiber 26 while the intensities of the light components projected on the principal axes, namely, the p-polarized component and s-polarized component of the polarized light at the time of incidence are maintained.

The p-polarized component and s-polarized component of the polarized light are picked up through reflection by the beam splitter 24 in equal quantities. The polarized light thus picked up is split by the polarization beam splitter 33 into the p-polarized component and the s-polarized component, which are incident on the detectors 32a and 32b, respectively. The detectors 32a and 32b output signals corresponding respectively to the light intensities of the p-polarized component and the s-polarized component, and the difference between the light intensities is picked up through a differential amplifier 34 as a reproduction signal.

The construction shown in FIGS. 1 and 3 permits the use of a reduced number of components for the movable portion in the optical head, and permits a smaller and lighter-weight design, thereby making it possible to shorten the access time and the information retrieval time. Further, because one polarization-maintaining optical fiber is used for the forward path and the backward path in common, it is easy to reduce the size and weight of the movable portion, and a flexible layout is achievable. Thus, replacement of the movable portion and the stationary portion is facilitated, and maintainability is markedly enhanced. The propagation of light through the polarization-maintaining optical fiber, without spatial propagation, makes it possible to obtain a favorably focused beam spot with little aberration. Moreover, it is possible to reduce the total cost, through enhanced assemblability.

Figure 5:
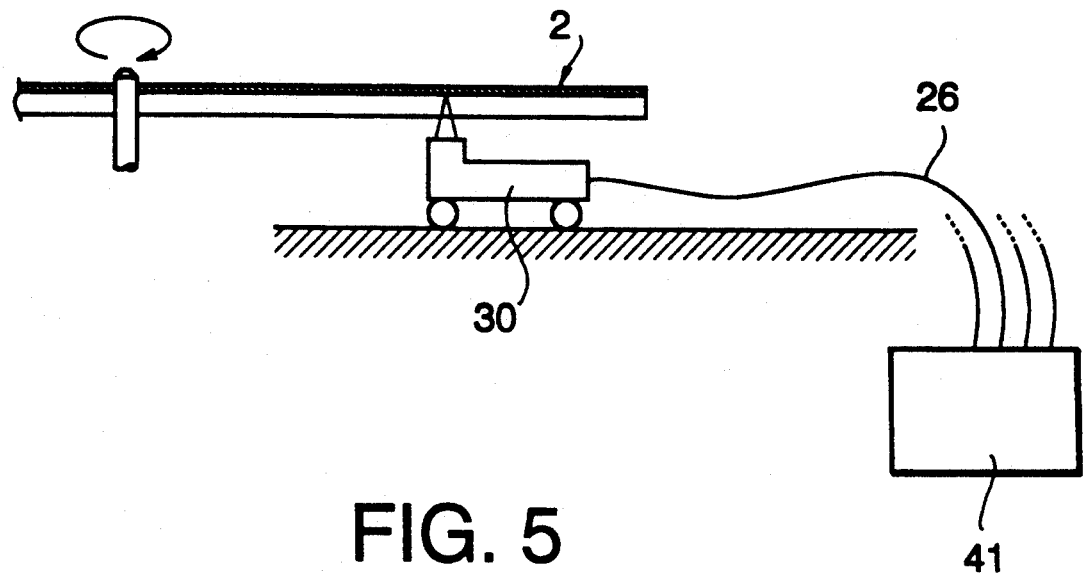
Figure 6:
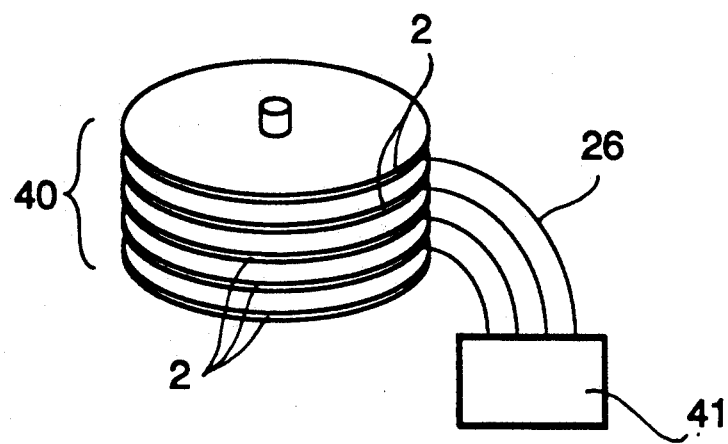

FIGS. 5 and 6 are conceptual views showing an application of the optical head of this embodiment to a large-capacity recorder.

In this application example, several stationary portions 20 of optical head are contained in the same casing 41, from which light is propagated through polarization-maintaining optical fibers 26 to movable portions 30 of the head. Several magneto-optic disks 2 are stacked one over another, and each of the movable portions 30 is disposed between adjacent ones of the disks 2 to constitute a stack-type disk device 40. This construction is enabled by the small and lightweight design of the movable portion 30, and it is thereby possible to realize a large-capacity recorder with a freer layout and more easily, as compared with the prior art.

Figure 7:
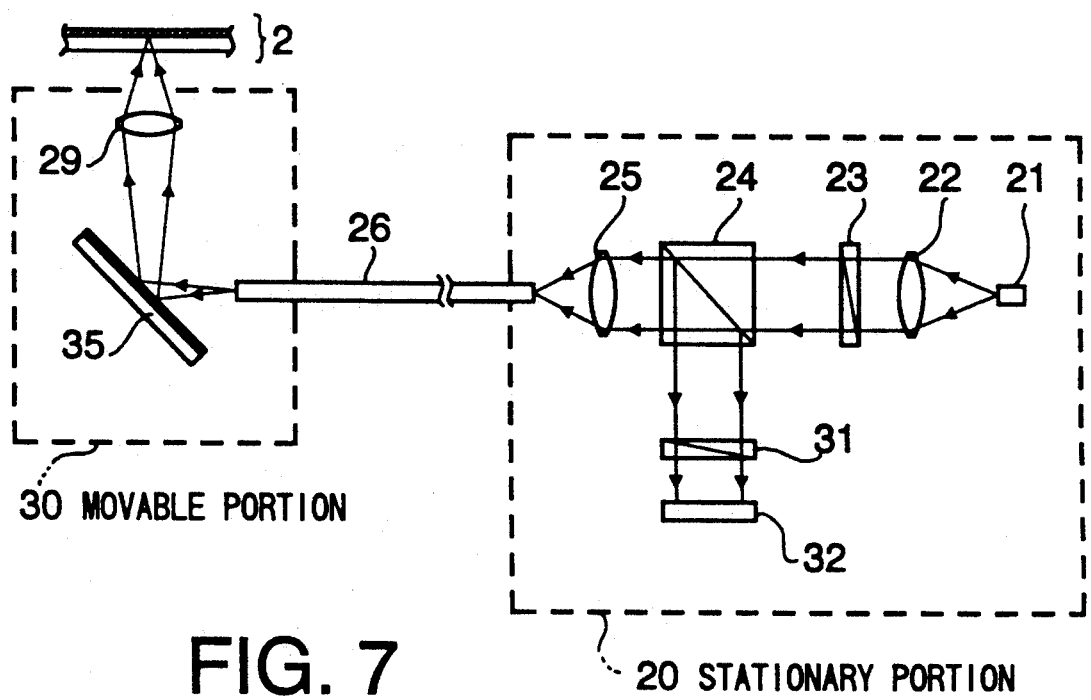
Figure 8:
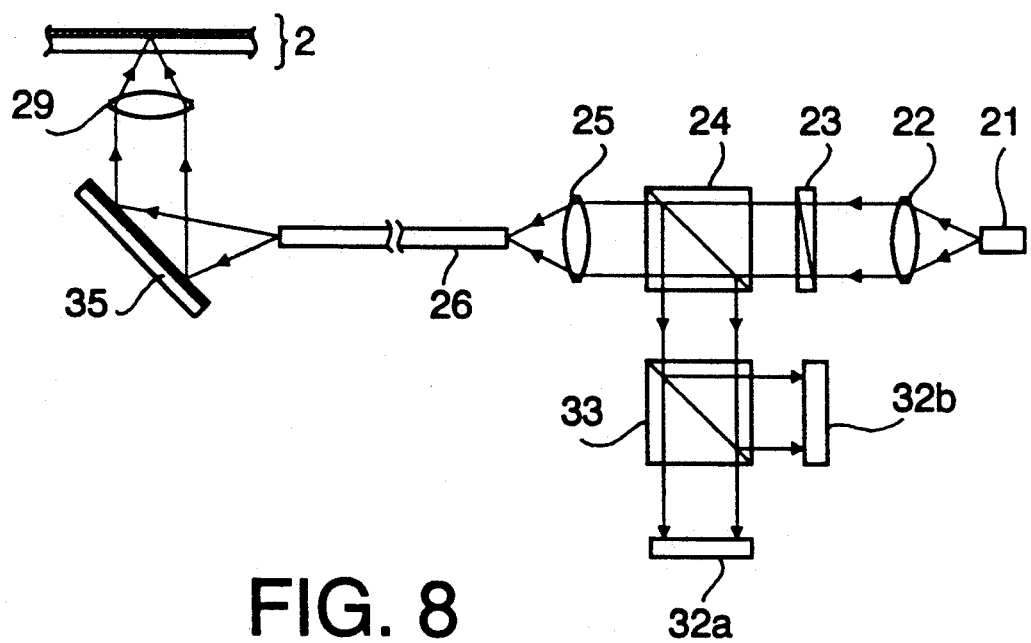
Figure 9:
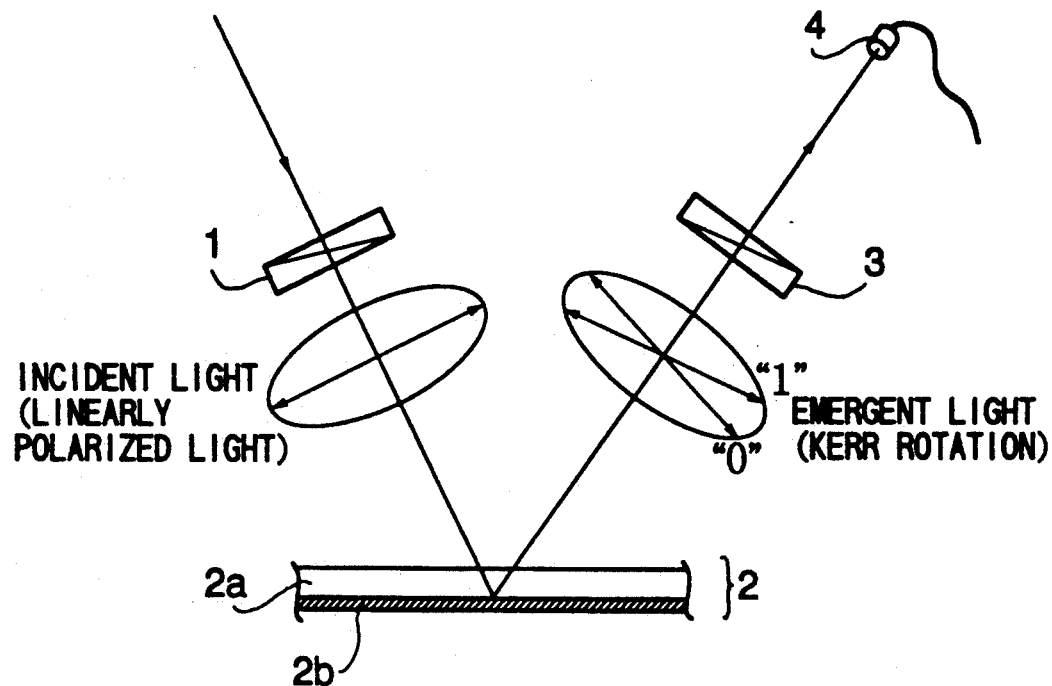
FIG. 9 is a schematic illustration of the operation of an extinction-type form of magneto-optical head according to the prior art.
Figure 10:
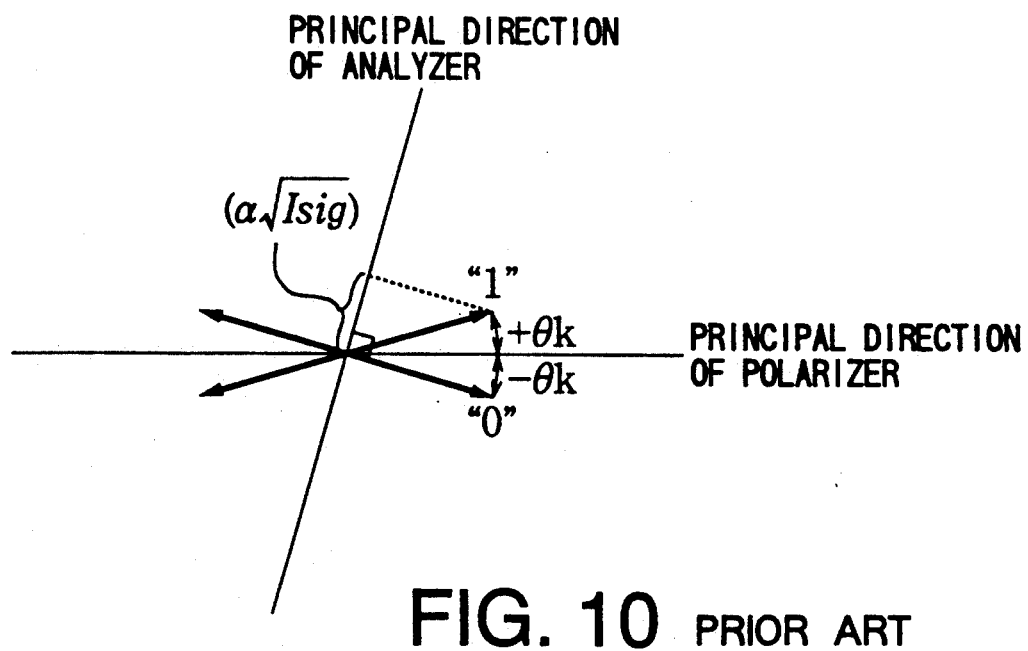
FIG. 10 is a diagram showing the azimuths of an analyzer and a polarizer for realizing the extinction-type form of the head according to the prior art.
Figure 11:
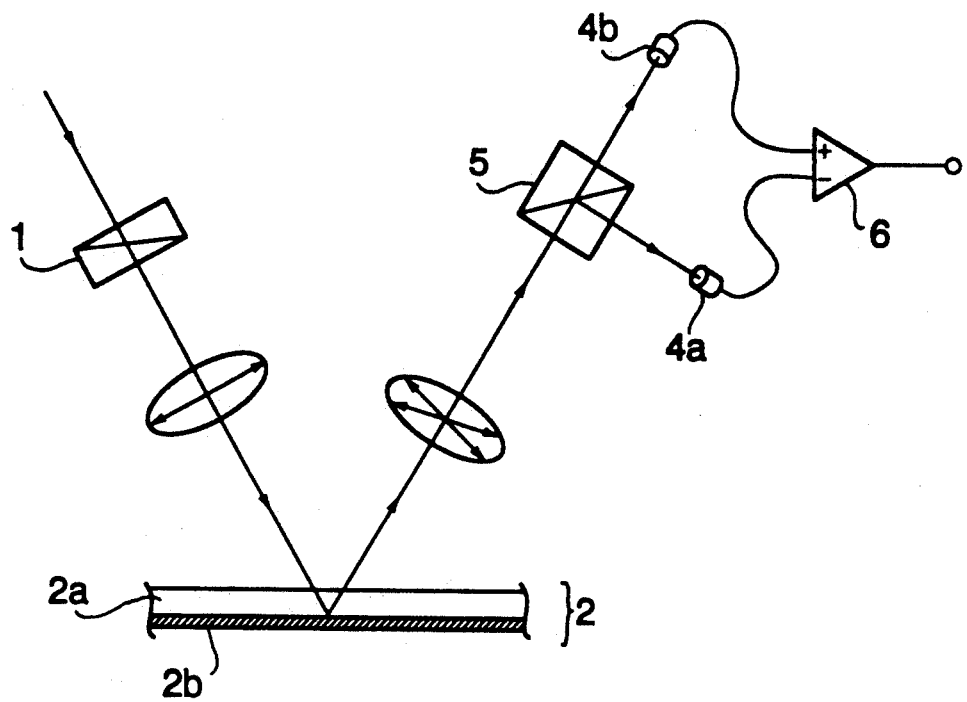
FIG. 11 is a schematic illustration of the operation of a differential-type form of magneto-optical head according to the prior art.
Figure 12:
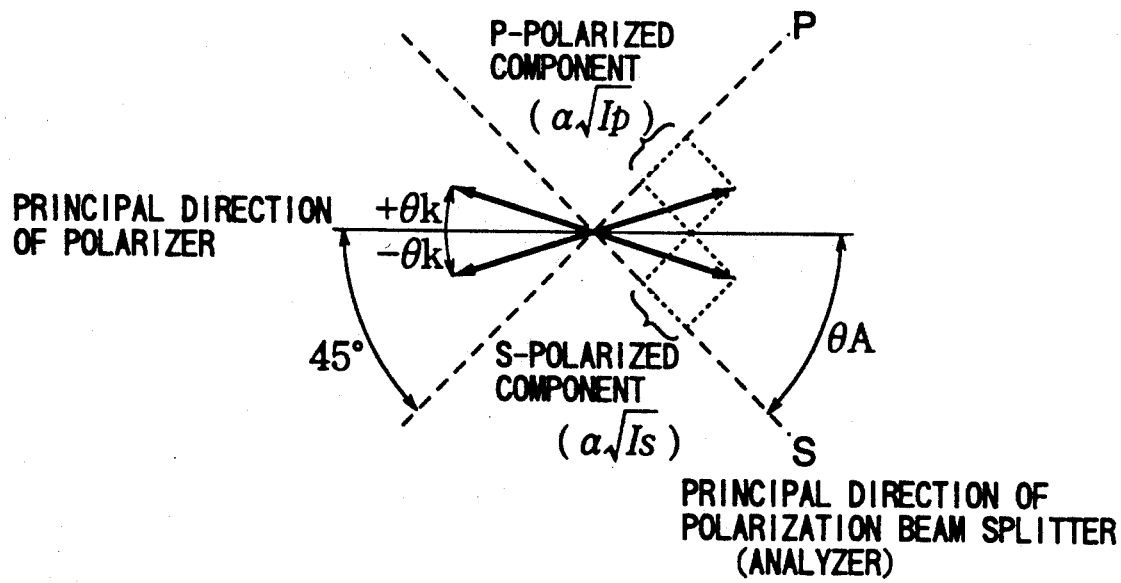
FIG. 12 is a diagram showing the principal directions of an analyzer and a polarizer for realizing the differential-type form according to the prior art.
Figure 13:
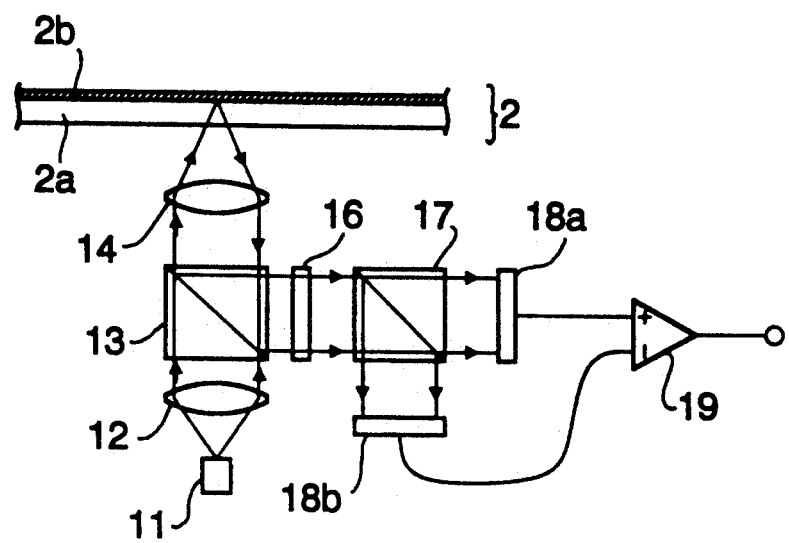
FIG. 13 is a schematic view of an optical system in a magneto-optical head according to the prior art.
Figure 14:
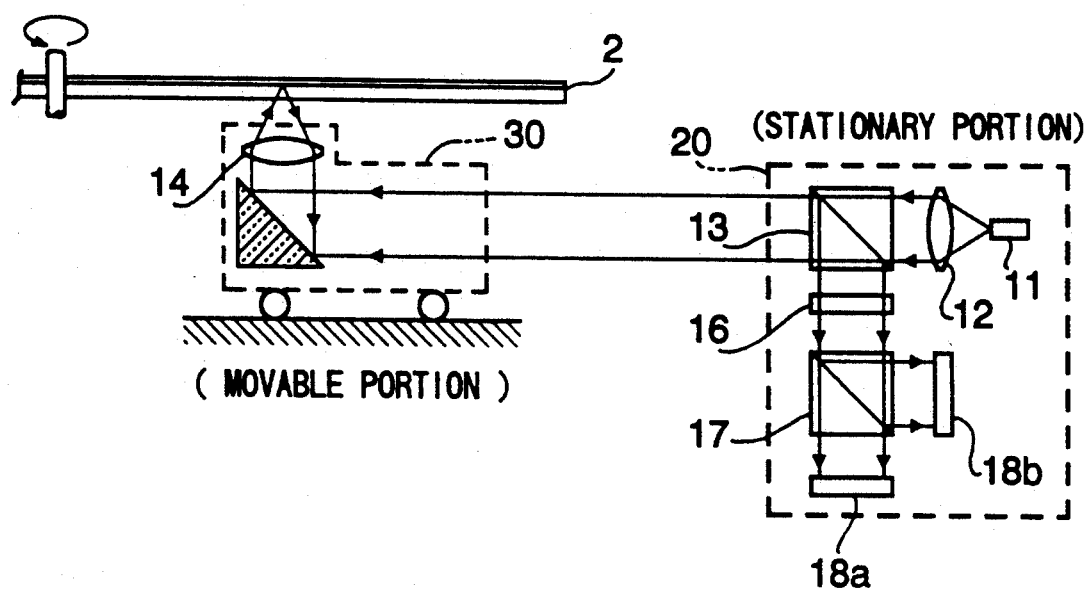
FIG. 14 is a schematic view of an optical system in a separate-type magneto-optical head according to the prior

FIGS. 7 and 8 illustrate another embodiment of the extinction-type form and another embodiment of the differential-type form, respectively, of the magneto-optical head according to this invention. FIGS. 7 and 8 differ from FIGS. 1 and 3 in that the collimating lens 27 is omitted.

The collimating lens 27 in FIGS. 1 and 3 is not necessarily required, and it is possible to focus a light beam by only the focusing lens 29, as shown in FIGS. 7 and 8. In this case, the beam emerging from the polarization-maintaining optical fiber 26 is securely focused on a single point if the emergence end of the optical fiber 26 is located farther than the focal point of the focusing lens 29. It is thus possible to construct the movable portion 30 with a lower accuracy during assembly, as compared with the embodiment shown in FIGS. 1 and 3. Therefore, it is possible to achieve a reduction in cost, through enhanced assemblability.

Furthermore, the azimuth rotator 28 may comprise a reflection-type azimuth rotator 35, as shown in FIGS. 7 and 8. In that case, the reflection-type azimuth rotator 35 is capable of being used also as a tracking control mirror, thereby enabling a more simple construction.

As has been described hereinabove, the following desirable effects are obtainable according to this invention:

(1) It is possible to divide the optical head into a movable portion and a stationary portion, with a polarization-maintaining optical fiber therebetween, and to compose the movable portion of a smaller number of components. It is thereby possible to realize a movable portion reduced in size and weight. Accordingly, it is possible to shorten the access time and the information retrieval time.

(2) The use of one polarization-maintaining optical fiber for the forward path and the backward path, in common, contributes to reductions in the size and weight of the movable portion, and enables a flexible layout. Thus, replacement of the movable portion and the stationary portion is facilitated, and maintainability is markedly enhanced.

(3) Because light is propagated through the polarization-maintaining optical fiber in such a manner that the forward path and the backward path coincide with each other, a favorably focused beam spot with little aberration is obtainable.

(4) A reduction in the total cost is achievable through enhanced assemblability.

What is claimed is:

1. An optical fiber type magneto-optical head comprising:
   first optical means for condensing a polarized light beam and leading the light beam into a polarization-maintaining optical fiber;
   second optical means for focusing light emerging from the optical fiber into a beam spot on a magnetic recording film;
   a detector for detecting through the optical fiber light reflected from the magnetic recording film with a change in polarized state; and
   an azimuth rotator through which there is transmitted light passing between the second optical means and the optical fiber, the azimuth rotator being designed so that the angle of optical rotation upon one pass therethrough is $$\theta k/2 \pm n\cdot 45°$$

where
   $\theta k/2$: the Kerr rotation angle of the magnetic recording film, and
   n=0, 1, 2, ....

2. The optical fiber type magneto-optical head as set forth in claim 1, wherein the azimuth rotator comprises a Faraday element comprising an optically active substance.

3. The optical fiber type magneto-optical head as set forth in claim 1, wherein the azimuth rotator comprises a reflection-type azimuth rotator.

4. The optical fiber type magneto-optical head as set forth in claim 3, wherein the reflection-type azimuth rotator also functions as a tracking mirror.

5. The optical fiber type magneto-optical head as set forth in claim 1, wherein the second optical means comprises a focusing lens, and a collimating lens is disposed between the azimuth rotator and the polarization-maintaining optical fiber.

6. The optical fiber type magneto-optical head as set forth in claim 1, wherein the second optical means comprises a focusing lens, and the emergence end of the polarization-maintaining optical fiber is located further from the focusing lens than the focal point of the focusing lens.

7. The optical fiber type magneto-optical head as set forth in claim 1, wherein the head includes a movable portion and a stationary portion, with the second optical means and the azimuth rotator forming a part of the movable portion and the first optical means forming a part of the stationary portion, and the polarization-maintaining optical fiber is disposed between the movable portion and the stationary portion.

8. The optical fiber type magneto-optical head as set in claim 1, wherein the head includes a plurality of movable portions and a plurality of stationary portions, the movable portions being each disposed between adjacent ones of a plurality of magneto-optic disks stacked one above another so as to collectively constitute a stack-type disk device.

9. The optical fiber type magneto-optical head as set forth in claim 1, wherein the principal direction of the polarization-maintaining optical fiber coincides with the principal direction of the azimuth rotator.

10. An optical fiber type magneto-optical head comprising:
    a laser light source;
    a polarizer for linearly polarizing laser light emitted from the laser light source;
    first optical means for condensing a polarized light beam emerging from the polarizer;
    a polarization-maintaining optical fiber, into which the polarized light beam is led while being condensed by the first optical means;
    second optical means for focusing light emerging from the optical fiber into a beam spot on a magnetic recording film;
    an azimuth rotator disposed between the second optical means and the optical fiber;
    a beam splitter for branching light reflected from the magnetic recording film with a change in polarized state and returned through the azimuth rotator and the optical fiber; and
    a detector for detecting the reflected light branched by the beam splitter, wherein the azimuth rotator is designed so that the angle of optical rotation upon one pass therethrough is $$\theta k/2 \pm n\cdot 45°$$

where
    $\theta k/2$: the Kerr rotation angle of the magnetic recording film,
    n=0, 1, 2, ....

11. The optical fiber type magneto-optical head as set forth in claim 10, wherein the principal direction of the polarization-maintaining optical fiber coincides with the principal direction of the azimuth rotator.

12. An optical fiber type magneto-optical head comprising:
    a laser light source;
    a polarization beam splitter for converting laser light emitted from the laser light source into a linearly polarized light beam;
    first optical means for condensing the polarized light beam emerging from the polarization beam splitter;
    a polarization-maintaining optical fiber into which the condensed, polarized light beam is led;
    second optical means for focusing light emerging from the optical fiber into a beam spot on a magnetic recording film;
    an azimuth rotator disposed between the second optical means and the optical fiber; and
    a detector for detecting light reflected from the magnetic recording film with a change in polarized state, returned through the azimuth rotator and the optical fiber and branched by the polarization beam splitter; wherein the azimuth rotator is designed so that the angle of optical rotation upon one pass therethrough is $$\theta k/2 \pm n\cdot 45°$$

where $\theta k/2$: the Kerr rotation angle of the magnetic recording film, and,
    n=0, 1, 2, ....

13. An optical fiber type magneto-optical head comprising:
   first optical means for condensing a polarized light beam and leading the light beam into a polarization-maintaining optical fiber;
   second optical means for focusing light emerging from the optical fiber into a beam spot on a magnetic recording film;
   an azimuth rotator through which there is transmitted light passing between the second optical means and the optical fiber;
   a beam splitter for branching light reflected from the magnetic recording film with a change in polarized state and returned through the azimuth rotator and the optical fiber;
   a polarization beam splitter for branching into an s-polarized wave and a p-polarized wave the reflected light branched by the beam splitter; and
   detectors for detecting the s-polarized wave and the p-polarized wave, respectively, wherein the azimuth rotator is designed so that the angle of optical rotation upon one pass therethrough is $+22.5°\pm n\cdot 45°$, where $n = 0, 1, 2, \ldots$.

14. An optical fiber type magneto-optical head of the differential type, comprising:
   a laser light source;
   a polarizer for linearly polarizing laser light emitted from the laser light source;
   first optical means for condensing a polarized light beam emerging from the polarizer;
   a polarization-maintaining optical fiber, into which the polarized light beam is led while being condensed by the first optical means;
   second optical means for focusing light emerging from the optical fiber into a beam spot on a magnetic recording
   an azimuth rotator disposed between the second optical means and the optical fiber;
   a beam splitter for branching light reflected from the magnetic recording means with a change in polarized state and returned through the azimuth rotator and the optical fiber;
   a polarization beam splitter for branching into an s-polarized wave and a p-polarized wave the reflected light branched by the beam splitter; and
   detectors for detecting the s-polarized wave and the p-polarized wave, respectively, wherein the azimuth rotator is designed so that the angle of optical rotation upon one pass therethrough is $+22.5°\pm n\cdot 45°$, where $n = 0, 1, 2, \ldots$.

15. The optical fiber type magneto-optical head as set forth in claim 14, wherein the principal direction of the polarization-maintaining optical fiber coincides with the principal direction of the polarizer.

16. An optical fiber type magneto-optical head of the differential type, comprising:
   a laser light source;
   a polarizer for linearly polarizing laser light emitted from the laser light source;
   first optical means for condensing a polarized light beam emerging from the polarizer;
   a polarization-maintaining optical fiber, into which the polarized light beam is led while being condensed by the first optical means;
   second optical means for focusing light emerging from the optical fiber into a beam spot on a magnetic recording film;
   an azimuth rotator disposed between the second optical means and the optical fiber;
   a beam splitter for branching light reflected from the magnetic recording means with a change in polarized state and returned through the azimuth rotator and the optical fiber;
   a polarization beam splitter for branching into an s-polarized wave and a p-polarized wave the reflected light branched by the beam splitter; and
   detectors for detecting the s-polarized wave and the p-polarized wave, respectively, wherein the azimuth rotator is designed so that the angle of optical rotation upon one pass therethrough is $+22.5°\pm n\cdot 45°$, where $n = 1, 2, \ldots$.

17. The optical fiber type magneto-optical head as set forth in claim 16, wherein the principal direction of the polarization-maintaining optical fiber coincides with the principal direction of the polarizer.

* * * * *